United States Patent
Klimovitsky

[19]

[11] Patent Number: 5,232,384
[45] Date of Patent: Aug. 3, 1993

[54] MOTION DRIVE OF MARINE UNDERWATER/ABOVEWATER SHIP

[76] Inventor: Alexandr Klimovitsky, 243 Broadway, #502, Cambridge, Mass. 02139

[21] Appl. No.: 761,404

[22] Filed: Sep. 17, 1991

Related U.S. Application Data

[63] Continuation-in-part of Ser. No. 441,896, Nov. 27, 1989, abandoned.

[51] Int. Cl.$^5$ ............................................. B60L 11/02
[52] U.S. Cl. .......................................................... 440/6
[58] Field of Search ................ 440/5, 6, 17; 60/203.1, 60/221, 222; 417/48

[56] References Cited

U.S. PATENT DOCUMENTS

| | | | |
|---|---|---|---|
| 3,079,751 | 3/1963 | Lewis | 60/203.1 |
| 3,088,988 | 5/1963 | Menke | 60/203.1 |
| 3,110,294 | 11/1963 | Nyman | 60/203.1 |
| 3,128,595 | 4/1964 | Meyer | 60/203.1 |
| 3,141,296 | 7/1964 | Jacobs, Jr. et al. | 60/203.1 |
| 3,149,459 | 9/1964 | Ulam | 60/203.1 |
| 3,647,137 | 3/1972 | Naydan | 60/203.1 |
| 3,669,056 | 6/1972 | Wurmbrand et al. | 440/6 |
| 4,766,724 | 8/1988 | Gruber | 60/203.1 |
| 4,821,509 | 4/1989 | Burton et al. | 60/203.1 |

*Primary Examiner*—Edwin L. Swinehart

[57] ABSTRACT

Motion drive of underwater or abovewater ship where mobile parts of propulsion installation (screw-propellers) are eliminated. This allows to achieve high specific compactness and high efficiency of the drive. Different energy sources (kinematic and static) can be used simultaneously or alternatively for activation. This is realized by automatically controlled in time accumulation of high-voltage electric energy on capacitors from different energy sources and their following discharges in aqueous medium of working cylinders mounted on the ship below waterline and made of high structural strength material to withstand high pressure hydraulic impacts. Voltage, current and frequency of these discharges are controlled and regulated by control system. Electrohydraulic phenomenon occurs due to these high-voltage discharges. A direct conversion of electric energy to mechanic energy, specific for this phenomenon, provides controlled reactive movement of the ship. Control system controls low-to-high voltage converters, bank of capacitors for storing high voltage electrical energy, charge and discharge distributors for controlled commutation for charging and discharging capacitors between electrodes placed within working cylinders, flow of water to the working cylinders. Water within cylindeders after each discharge is propelled out from the member driving the ship in direction opposite to a direction of propelled water, then after discharge the cylinder is being filled with water again.

16 Claims, 8 Drawing Sheets

MOTION DRIVE OF MARINE UNDERWATER/ABOVEWATER SHIP

This is a continuation-in-part of the U.S. patent application Ser. No. 07/441,896 filed Nov. 27, 1989, now abandoned.

FIELD OF THE INVENTION

The invention relates to underwater and abovewater transport-fleet and shipbuilding. Motion drive of the ship proposed herein contains power installation using any energy sources, propulsion installation without mobile working parts and computer-based control system.

BACKGROUND OF THE INVENTION

Existing motion drives of ships are being built today according to different functional diagrams with different complexity. The simplest diagram is one in which working part of the ship, screw-propeller, is actuated to rotation by means of energy of internal combustion engine and stiff kinematic transmission.

In another relatively simple functional diagrams of motion drive the screw-propeller is actuated to rotation by the energy of electric motor supplied from on-board batteries.

In more complicated functional diagrams the machine cascades (i.e. Diesel-electrogenerator and different power installations such as steam-turbine, gas-turbine, water-turbine, nuclear and others and also their combinations) are used as energy sources.

In the past certain countries conducted research and development aimed to find and employ new, effective principles (other than using screw-propeller) of ship's motion drive.

For example, "Bell-Aerospace" Company (USA) built large tonnage hovership for the Navy [B.1, page 221].

| Main specification of the ship: | |
| --- | --- |
| weight | 2000 ton, |
| speed | 150 kmph/94 mph, |
| designation | ship-hunter for submarines. |

"Boeing" Concern (USA) has built a ship "Jetfoil" actuated by reactive water power installation. The distinction between such power installation and power installation of ordinary ship with screw-propeller is of the same nature as the distinction between reactive air liner and ordinary propeller airplane [B.1, page 217].

| Main specifications of the ship: | |
| --- | --- |
| weight | 106 ton, |
| length | 27.5 m/88 ft, |
| speed | 90 kmph/56 mph, |
| designation | conveyance of 250 passengers. |

In the USSR, on Caspian Sea, the gigantic hybrid of airplane and ship named "Caspian monster", actuated by 9 gas turbines, has been tested for several years [B.2, page 35].

| Main specifications of the ship: | |
| --- | --- |
| weight | 500 ton, |
| length | 61 m/196 ft, |
| speed | 500 kmph/32 mph, |
| designation | guided-missile ship |

However the indicated motion drives of existing ships have a number of disadvantages, restraining their wide spread, such as:
- complexity of functional diagrams of motion drives and their control,
- low profitability and efficiency,
- large "dead" weight, high installed power of energy conversion units and their cost,
- presence of mobile working parts, and others.

The described in this patent application motion drive of a ship solves a number of problems. This is reflected in presented objects of the invention.

SUMMARY OF THE INVENTION

The object of this invention is to achieve following features of ship's motion drive:
- simultaneous employment of one or series of different energy sources for the movement,
- elimination of mobile working parts from propulsion installation and achievement of its specific compactness,
- essential increase of efficiency due to a direct conversion of electric energy into mechanical energy of movement,
- reliability and longevity,
- effectiveness, flexibility and simplicity of control.

In this motion drive, containing power installation, propulsion installation and control system, the described object is achieved by following:

power installation is combined with low-to-high voltage converters allowing to regulate output voltage level, by the distributor of charging current and by bank of groups of capacitors;

propulsion installation is designed as one or a number of hollow, open at one side working cylinders, mounted in the back part of a ship along its longitudinal axis below the waterline. Each of these working cylinders contains controlled valves and electrodes. These electrodes are placed in such position which allows to form certain distance between their ends inside of each cylinder. This distance is a working clearance through which occur high voltage and power discharges, distributed by the distributor of discharge pulses which is included in propulsion installation. Level, number and frequency of these discharges and required power of the installation are controlled and selected according to the required speed and acceleration of the ship. These discharges occur in the aqueous medium of working cylinders and create reactive forces for movement of the ship during the electrohydraulic phenomenon;

control system contains computer, executive devices, measuring converters, transducers and isolation circuits, provides programmable synchronous operation and checking of all system devices and modes of the drive, and controls sequence and order of charges and discharges of capacitors placed in groups by the controlled commutation of the distributor of charging current and distributor of discharge pulses, according to the required characteristics of the drive's operation;

energy sources are connected to the inputs of converters. These converters jointly with the distributor of charging current, bank of groups of capacitors, distributor of discharge pulses and electrodes of working cylinders, form a series functional circuit;

control system has bi-directional control bus for control and checking of all the named above devices of the drive.

BRIEF DESCRIPTION OF THE DRAWING

FIGS. 4a-c shows alternatives of working cylinder positioning, for:

FIGS. 4a-1 and a-2—submarine,

FIGS. 4b-1 and b-2—abovewater ship,

FIGS. 4c-1 and c-2—hydrofoil ship and catamaran;

FIG. 5a.—shows commutation of the negative polarity switch 10,

FIG. 5b.—shows commutation of the positive polarity switches 10,

FIG. 5c.—shows the process of capacitors charge,

FIG. 5d.—shows commutation of positive polarity switches 13,

FIG. 5e.—shows commutation of negative polarity switch 13,

FIG. 5f.—shows the process of capacitors discharge,

FIG. 5g.—shows opening of controlled valves,

FIG. 5h.—shows epure of water pressure in the working cylinder.

FIGS. 6a, 6-b and 6-c show block diagram of one example of the control algorithm of the motion drive.

DESIGNATIONS ON FIGURES

1—power installation,
2—propulsion installation,
3—control system,
4—energy sources,
5—low-to-high voltage converters with controlled output level,
6—distributor of charging current,
7—bank of groups of capacitors,
8—distributor of discharge pulses,
9—working cylinders,
10—switches of distributor of charging current,
11—capacitors,
12—groups of the capacitors,
13—switches of the distributor of discharge pulses,
14—electrodes inside working cylinders,
15—body of the working cylinder,
16—stiffening ribs,
17—insulators of the electrodes,
18—controlled valves,
19—cover of the working cylinder,
20—supply channels of the controlled valves,
21—control computer
22—executive devices,
23—measuring converters,
24—transducers,
25—isolation circuits,
1—the working clearance between electrodes,
WL—waterline of the ship,
$U_{(4)}$—output voltages of energy sources 4,
$U_{(5)}$—output voltages of the converters 5,
$U_{(11)}$—voltages on the capacitors 11,
$t_1$—activation time of the switches 10 and 13,
$t_2$—holding time of the negative polarity switch 10,
$t_3$—holding time of the positive polarity switches 10,
$t_4$—duration of pulses for capacitor charging,
$t_5$—period of pulses for capacitor charging,
$t_6$—holding time of the positive polarity switches 13,
$t_7$—holding time of the negative polarity switch 13,
$t_8$—duration of pulses for capacitor discharging,
$t_9$—period of pulses for capacitor discharging,
$t_{10}$—time when controlled valves 18 are in the opened state,
$t_{11}$—time when surplus pressure retains in the working cylinder,
$t_{12}$—time when pressure in the working cylinder is compensated (equal to the pressure outside working cylinder).

DETEILED DESCRIPTION OF THE INVENTION

The described motion drive of a ship contains three principal parts (FIG. 1): power installation 1, propulsion installation 2 and control system 3.

Figure 1:
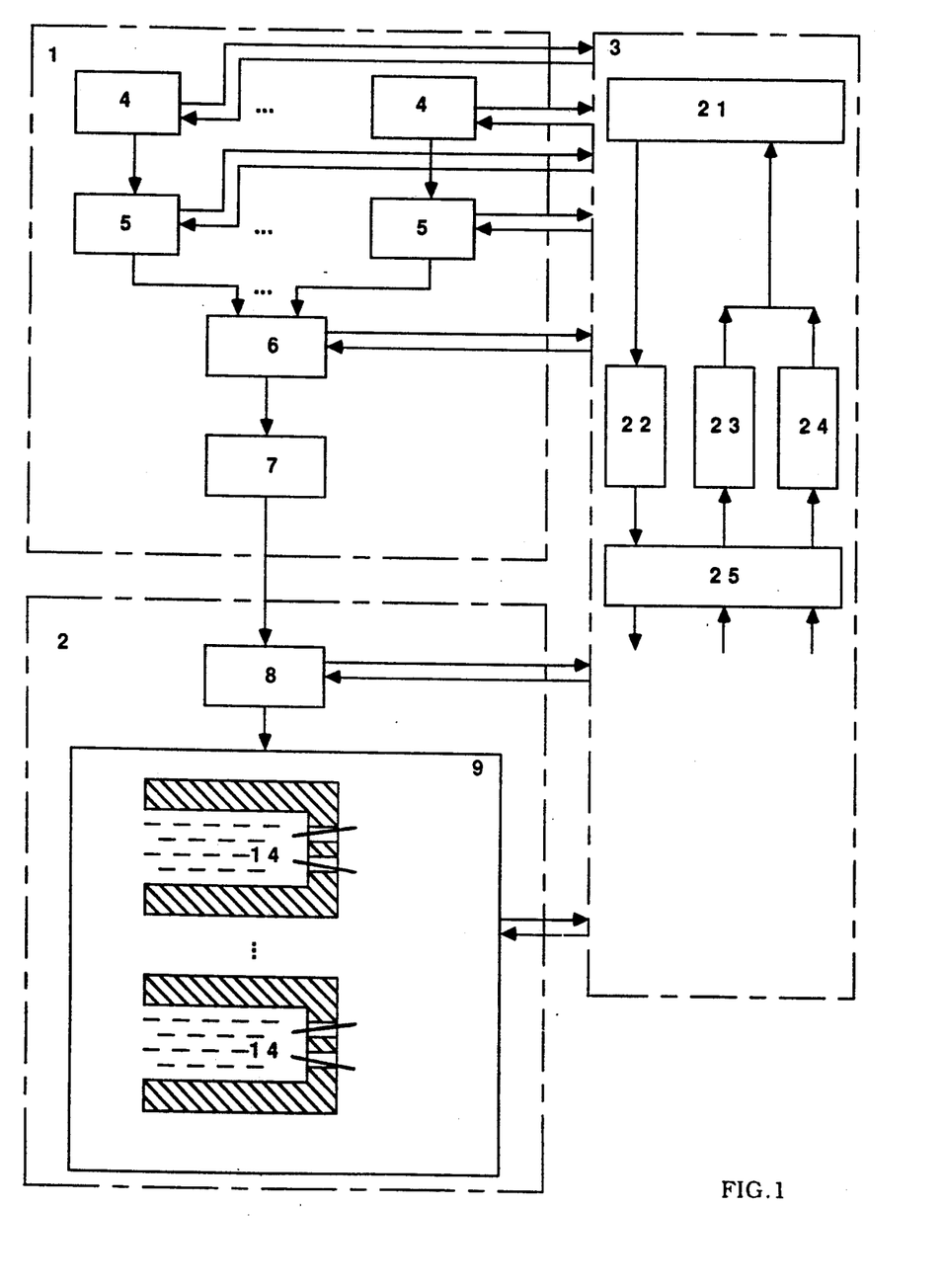
FIG. 1 shows a structural block-diagram of the motion drive.

Power installation 1 contains one or several energy sources 4, low-to-high voltage converters 5 with controlled output level, distributor of charging current 6 and bank of groups of capacitors 7.

Energy sources 4 can be both kinematic (machine) and static to provide electric energy of relatively low voltage. Internal combustion engine, steam (or gas) engine (or turbine), wind engine, electrochemical energy source (electric batteries), solar energy converter, nuclear power installation and any other can be used as a primary energy source.

Outputs of energy sources 4 are connected to inputs of the converters 5. This allows to increase output voltages to the level of 5-50 kV. These converters allow to get the required output voltage.

For this purpose any low-to-high voltage converter with any operating principle can be used, such as: Tesla resonance transformer, modulator-demodulator, diode-capacitor voltage multiplier, and others, and also their combinations.

Positive polarity terminals of converters 5 are connected to the distributor of charging current 6 (FIG. 2), presented by a set of switches 10 (rated for high voltages and currents and activated by the control system 3). Such switches can be presented by powerful ferreed contacts enclosed in vacuum casing since in high vacuum the clearance of approximately 1 mm between the contacts endures voltage of approximately 100 kV.

Figure 2:
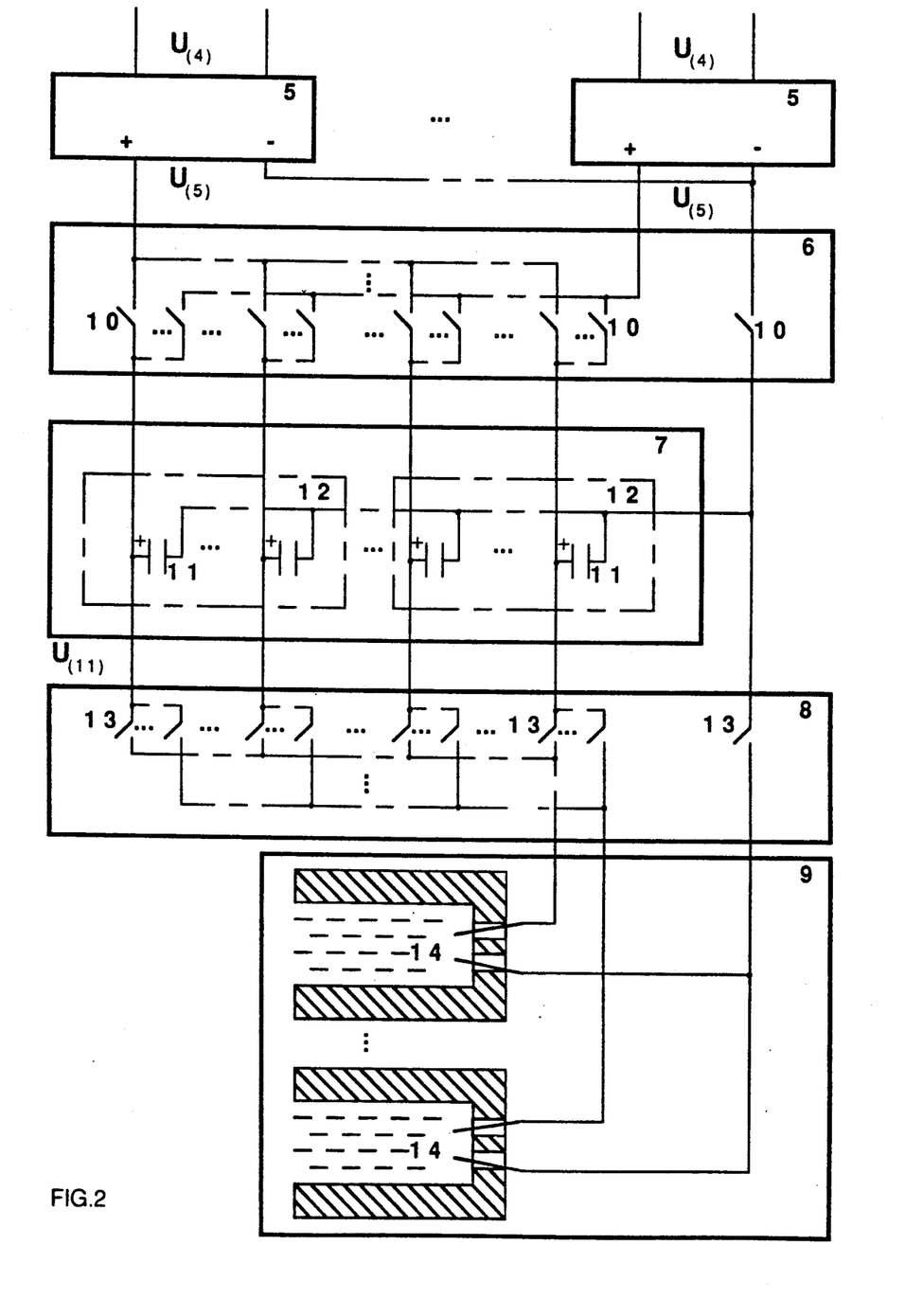
FIG. 2 shows a functional block-diagram of electric circuits.

The distributor 6 connects specified capacitors 11 of specified groups 12 to the outputs of specified converters 5 in specified sequence for specified time.

The capacitors in each group have equal nominal capacitance. The nominal capacitance of each next group of capacitors is either equal to the capacitance of its preceding group or different by increase of certain capacitance, and can be presented, for example, by following sequence: 100 $\mu$F, 200 $\mu$F, . . . , 900 $\mu$F, 1000 $\mu$F.

Therefore, electric energy supplied from different energy sources is accumulated on the capacitors. The transfer of energy from sources to the bank of capacitors occurs under the control of the control system 3 so that their average dynamic load remains constant when ship moves with constant speed.

The propulsion installation 2 contains distributor of discharge pulses 8 and one or more working cylinders 9.

Positive polarity terminals of capacitors 11 are connected with the distributor of discharge pulses 8 (FIG. 2). This distributor is represented by a set of switches 13, similar to switches 10, and is also activated by the control system 3. The distributor 8 provides connection of specified capacitors 11 of specified groups 12 to electrodes 14 of specified working cylinders in specified sequence for specified time.

Figure 3:
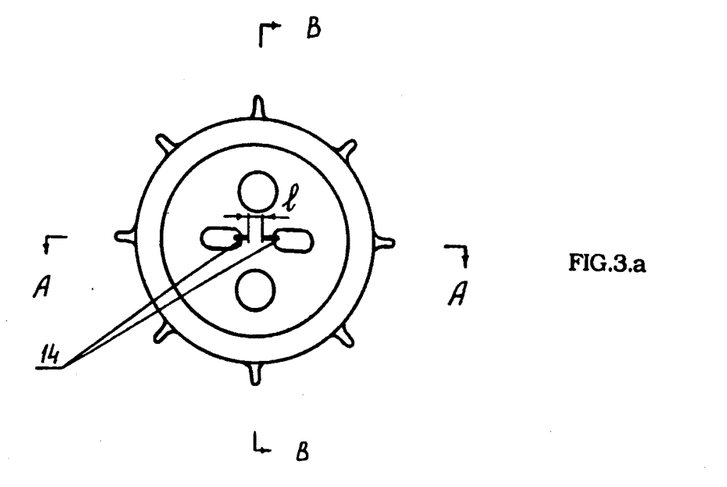
FIGS. 3a-c shows a schematic design of working cylinder.

Schematic design of working cylinder 9 is presented on the FIG. 3. The working cylinder is hollow and is opened from one side. The body 15 is made of highly durable material like special alloyed steel and has stiffening ribs 16 placed in longitudinal axis of it and is rated for high pressures, impact loads (hydraulic impacts) and cavitation.

Two electrodes 14 with working clearance "''" are mounted on insulators 17 inside cylinder's cavity in closed part of it. The controlled valves 18 allow to accelerate cyclic filling of cylinder's cavity with water supplying from the water medium in front of the cylinders from the channels 20 and to compensate the pressure inside the cylinder before every next discharge.

Frontal part of the body 15 of working cylinder is closed by the cover 19 made of streamlined form. It protects the electrodes from damages.

The inner cavity of working cylinders is filling with the water after every discharge since cylinders are mounted on the body of the ship below its waterline WL. Therefore at the low speed of the ship valves 18 can be eliminated.

Figure 4:
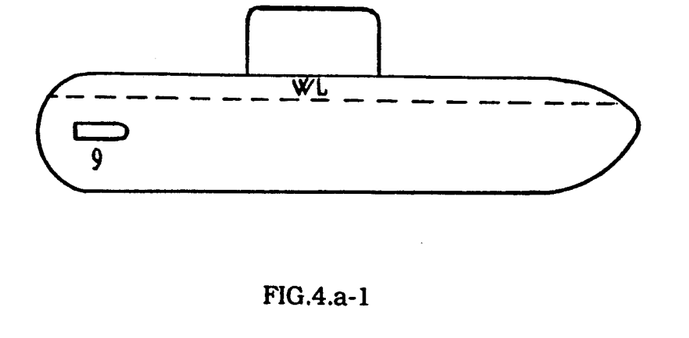

The alternatives of the working cylinders disposition on the body of the ship are presented on FIG. 4, for:
 a.—submarine,
 b.—abovewater ship,
 c.—hydrofoil ship and catamaran.

High pressure in aqueous medium arise as a result of electrohydraulic phenomenon [B.3, page 53], due to high-voltage and power-current (10–50 kA) discharges with duration of approximately 10–40 $\mu$sec in inner cavity of the working cylinder in working clearance "1" between the electrodes 14. The hydraulic impact wave created in this process forms a reactive force for the ship's movement. High pressure is being developed in a relatively small volume of the working cylinder. That allows to achieve specific compactness of the drive. It was calculated that in the cavity of working cylinder the hydraulic impact wave pressure will exceed 2 tons per square centimeter.

Therefore this process provides a spontaneous direct conversion of electric energy to mechanical energy of the ship's movement.

Control system 3 contains the control computer 21 with its input and output, executive devices 22, measuring converters 23, transducers 24 and isolation circuits 25. Jointly they provide a programmable synchronous operation and a checking of all devices and modes of the drive, namely:
 control of energy sources 4,
 controlled regulation of the output voltage of converters 5,
 charges and discharges on capacitors 11 in groups 12 by commutation of the switches (with checking of their state) of distributor of charging current 6 and distributor of discharge pulses 8 in a specified order,
 control of valves 18 and checking of their state,
 measurement of voltages on the devices 4,5,7 by means of isolation circuits,
 measurement of other physical parameters necessary for checking of normal operation of different devices and whole drive. Control system of the drive includes control computer with a bi-directional control bus for controlling the voltage at the voltage output of the energy source, the voltage at the voltage converter input and output, the voltage on capacitors, voltage and current in the clearance gap between the electrodes of the cylinders, for controlling distributor of charging current and distributor of discharge pulses, and also valves. Control computer checks normal operation of the energy source, normal operation of the voltage converter, the state of each capacitor by checking leakage, short circuit and loss of capacitance in each said capacitor, and normal mechanical state of each cylinder and normal functioning of the electrodes. Control computer selects capacitors in groups for charging and discharging and these cylinders where discharges occur. Each of these devices controlled by the control system have input and output control terminals which are connected to the bi-directional control bus, wherein each output control terminal being connected to a first direction bus of the bi-directional control bus to supply measurement and checking data from the output control terminals to the control computer, and each input control terminal being connected to a second direction bus of the bi-directional control bus to provide control signals from the control computer to modify state of the controlled devices of the motion drive. Analog-to-digital converter and digital-to-analog converter having an input and output, the input of the digital-to-analog converter being connected to the second direction bus of the bi-directional control bus, and the output of the analog-to-digital converter being connected to the first direction bus of the bi-directional control bus. Output control terminals of the controlled devices are connected to an input of the analog-to-digital converter to convert analog voltage on each said output control terminal into computer-compatible form at an output of the analog-to-digital converter. Output of the analog-to-digital converter being connected to the control bus to input measured voltages from each output control terminal to the control computer. Input control terminals are connected to an output of the digital-to-analog converter to supply computer control instructions from the control computer through the bus to all devices controlled by the control computer. These devices include the energy source, the voltage converter, the capacitors, the means for connecting the input of the voltage converter to the energy source output, distributor of charging current and the distributor of discharge pulses, the valves. Computer instructions are being converted by the digital-to-analog converter into analog signals used to modify state of said devices, the performance of the whole motion drive and to control speed and acceleration of the ship. The power of the motion drive, speed and acceleration of the ship are controlled by modifying a number of selected charged capacitors in groups, the capacitance of each selected charged capacitor, a number of selected cylinders where the discharges occur, and a frequency and a number of the discharges.

Consider the operation of the drive. In its initial state the selected energy sources 4 are activated, their output voltages are connected to inputs of the converters 5, the switches 10 and 13 are opened, voltages on the capacitors 11 of all the groups 12 are equal to zero, and the ship is in the rest state.

The required output voltages of converters 5 is regulated by the control signal received from the control system 3.

In particular case one energy source 4 and one converter 5 with one uncontrolled level of the output voltage, can be used.

Then those capacitors 11, a group (or groups) 12 of which must be charged, are selected and connected to the outputs of the converters 5 by the control system 3.

For this purpose the specified switches 10 of distributor 6 are closed sequentially in time. For example, to charge the 1-st capacitor 11 (left on the FIG. 2) in the 1-st group 12 (left on the FIG. 2) by 1-st converter 5 (left on the FIG. 2), the 1-st positive polarity switch 10 (left on the FIG. 2) is to be closed, for the 2-nd capacitor-2-nd switch is to be closed, and so forth. Negative polarity switch 10 (last on the right on the FIG. 2) is closed in the initial state and remains closed during the charge of the group.

To get the required capacitance of charged capacitors, determining stored energy, two versions of capacitors distribution can be realized using the control system 3.

First version consists in spontaneous selection of the charged group of capacitors with the specified nominal capacitance. This version is applicable when bank 7 of groups of capacitors contains groups distinguished by the nominal capacitance of its capacitors.

Second version is applicable when the bank contains of groups of capacitors of any nominal capacitance. For example, all the first capacitors from different groups, all second capacitors of different groups and so forth, are connected in parallel with each other.

To provide such connections during the charge, positive polarity switches 10 for all first capacitors of different groups are closed first, then negative polarity switch 10 (last on the right of the FIG. 2) is closed. This order repeats for all second, all third and so forth, capacitors of different groups.

Each discharge of the capacitors in the working clearances between electrodes of working cylinders is realized by switches 13 of the distributor of discharge pulses 8 in the time intervals between two following one after another charges, i.e. when switches 10 of distributor are released (contacts are open).

In accordance with energy expenditure required by the motion drive, discharges of capacitors can be realized in four different ways (versions) by help of the control system 3 and switches 13.

First version: capacitors from different groups are discharged in eachworking cylinder.

Second version: the same capacitors from selected groups are discharged simultaneously in all working cylinders.

Third version: the capacitors from different groups, connected in parallel, are discharged simultaneously in eachworking cylinder.

Forth version: the capacitors from the different groups connected in parallel are discharged simultaneously on all working cylinders.

For all described versions each discharge is occurred after closing of the positive polarity switches 13, and then negative polarity switch 13 (last on the right on FIG. 2).

The contains of working cylinder is being thrown out from the working cylinder after each discharge giving a progressive movement to the ship. The cylinder is being filled again since working cylinders are disposed below the waterline of the ship.

To accelerate filling of working cylinders with water and compensating of pressure inside and in outside of the cavity, the valves 18 are opening and closing in the time intervals between discharges.

Figure 5:
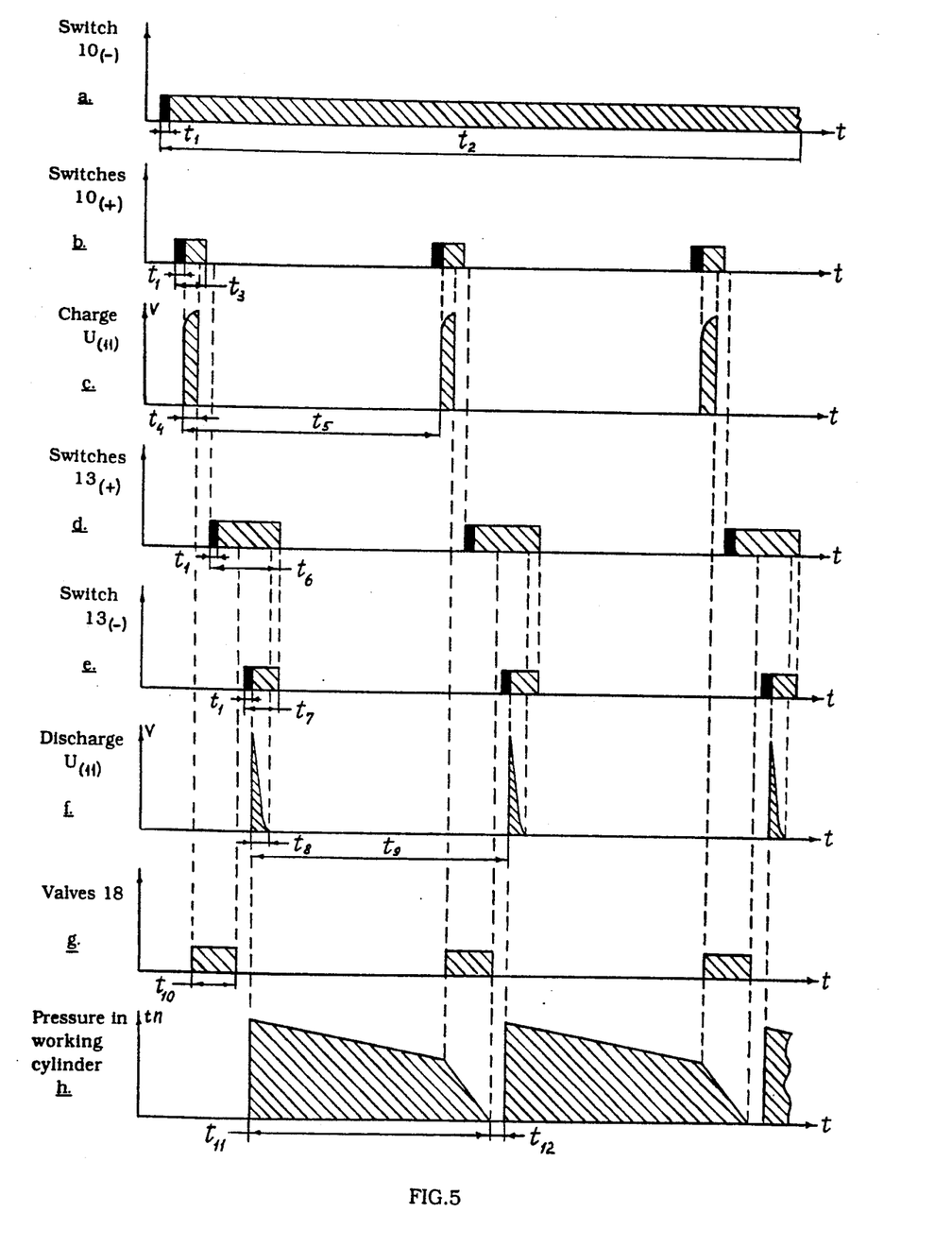
FIG. 5 shows the timing diagrams of the motion drive elements of one working cylinder for one particular case, where.

FIG. 5 presents a fragment of time diagrams for the particular case of the operation of described elements for one working cylinder of the motion drive:

a.—shows commutation of the negative polarity switch 10,
b.—shows commutation of the positive polarity switches 10,
c.—shows the process of capacitors charge,
d.—shows commutation of positive polarity switches 13,
e.—shows commutation of negative polarity switch 13,
f.—shows the process of capacitors discharge,
g.—shows opening of controlled valves,
h.—shows epure of water pressure in the working cylinder.

At these diagrams one can see the timing of all principal processes during the charge-discharge operation. For general case the operation the timing of drive's elements for each working cylinder and timing between different cylinders' operation can be presented using more complicated timing diagrams.

Therefore, the power of motion drive, the acceleration and the speed of ship are regulated by computer-based control system 3, including the special software controlling all required variables such as: number of activated energy sources 4, converters 5, their output voltages, required capacitance of the capacitors involved in the processes of charges and discharges, a number and frequency of high-voltage discharges in working cylinders, a number of these cylinders and others.

Figure 6:
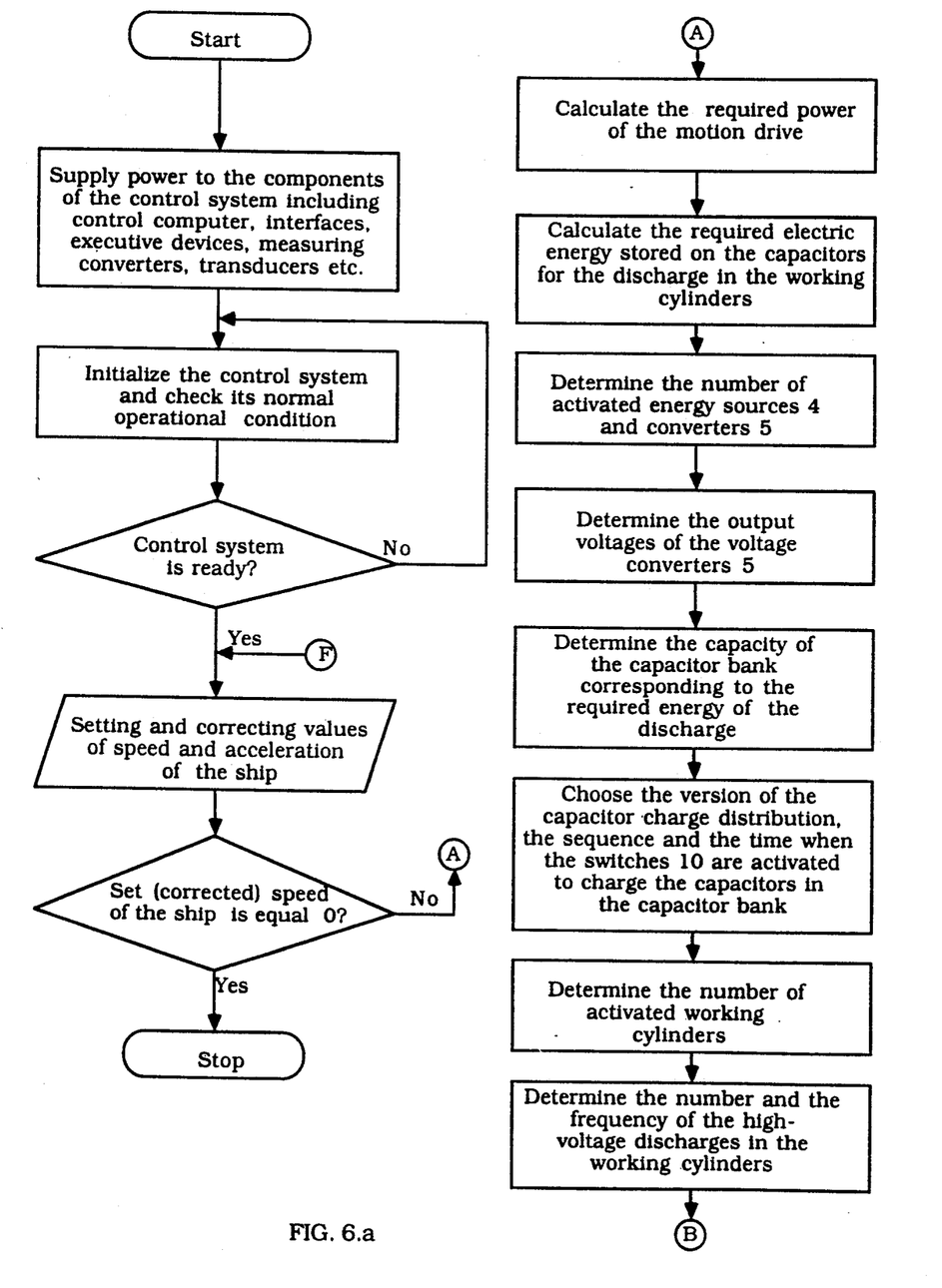

One possible example of control algorithm of the motion drive is conceptually presented on FIG. 6.

A described motion drive can be applied for the motion drives of existed and newly created ships.

BIBLIOGRAPHY

1. Felix R. Paturi. The architecturers of 21 centure. Published on 1983 by "Progress", Moscow, USSR.
2. Tzvi Paz "Caspian Monster", "Alef" weekly magazine, No. 247, Oct. 16, 1988, TelAviv, Israel.
3. Grand Soviet Encyclopedia, v. 30, "Electrohydraulic phenomenon". Published on 1978 by "Soviet Encyclopedia", Moscow, USSR

What is claimed is:

1. A motion drive for propelling a ship, comprising:
   (a) an energy source with a voltage output;

(b) voltage converter means for transforming a voltage at an input of said voltage converter means to a higher voltage at an output of the voltage converter means;

(c) means for connecting the input of the voltage converter means to the energy source output;

(d) capacitance means for storing electrical energy, said capacitance means having at least one capacitor;

(e) charge distributor means for selecting at least one said capacitor in the capacitance means to form a capacitor bank and connecting each capacitor in the capacitor bank to the output of the voltage converter means for charging each capacitor in the capacitor bank to store electric energy in each charged capacitor;

(f) at least one elongated hollow member made of high structural strength material to withstand high pressure hydraulic impacts and cavitations, each hollow member open at a first end and closed at a second end, each hollow member having at least one cavity extending from said first end to said second end, each hollow member mounted along the axis of the ship below the waterline, each hollow member comprising, at least one pair of electrically isolated electrodes with exposed ends within the cavity, substantially near the second end, said exposed ends forming a clearance gap between the exposed ends, and at least one opening disposed in a wall of the hollow member substantially near said second end, said opening extending entirely through the wall into the cavity;

(g) means for controlling flow of water into the cavity through said at least one opening;

(h) discharge distributor means for selecting said at least one cavity and for selecting said at least one charged capacitor in the capacitor bank and connecting each selected charged capacitor to the electrodes of said at least one selected cavity for discharging the stored electric energy in the water through the electrodes in said selected cavity;

(i) a control system for controlling, the means for connecting the input of the voltage converter means to the energy source output,
the charge distributor means,
the means for controlling flow of water into the cavity through at least one said opening,
the discharge distributor means,
wherein water within each selected cavity after each discharge in said selected cavity is propelled out from the first end reactively driving the ship in a direction opposite to a direction of propelled water, then water is allowed to fill each selected cavity after the water has been discharged, and at least one said capacitor discharged in the clearance gap between the electrodes is charged from the voltage converter means.

2. The motion drive of claim 1, wherein the energy source comprises a plurality of energy sources with means for selecting said energy sources, wherein the energy sources are both kinematic and static.

3. In the motion drive of claim 2 the voltage converter means having a plurality of voltage converters, wherein the means for connecting the input of the voltage converter means to the energy source output comprising means for connecting the input of said at least one voltage converter to the output of at least one said selected energy source.

4. The motion drive of claim 3, wherein the charge distributor means comprising means for connecting the output of said at least one voltage converter to at least one said selected capacitor in the first capacitor bank.

5. In the motion drive of claim 1 the voltage level at the output of the voltage converter means, on each charged capacitor in the capacitance means and between the exposed ends of the electrodes in the selected cavity at the moment of discharge is in the range from 5,000 Volts to 50,000 Volts, the electric current in the clearance gap between the electrodes during the discharge is in the range from 10,000 Amps to 50,000 Amps and the duration of each discharge is in the range from 0.01 sec to 0.04 sec, wherein said voltage level and said electric current in the clearance gap are controlled by the control system.

6. Motion drive of claim 1 wherein,
the charge distributor means comprising a set of switches activated by the control system and rated for high voltages and currents, said switches connecting each selected capacitor in the first capacitor bank to the output of the voltage converter means for a specified time in specified order and sequence, and
the discharge distributor means comprising a set of switches activated by the control system and rated for high voltages and currents, said switches connecting each selected charged capacitor in the second capacitor bank to the electrodes in at least one said selected cavity for a specified time in specified order and sequence to provide the discharge of each selected charged capacitor of the second capacitor bank.

7. In the motion drive of claim 4 the means for selecting at least one said voltage converter and connecting the output of each said voltage converter to at least one said selected capacitor in the first capacitor bank comprising a set of switches activated by the control system and rated for high voltages and currents, said switches connecting each selected capacitor in the first capacitor bank to the output of at least one said voltage converter for a specified time in specified order and sequence.

8. Motion drive of claim 1 wherein the control system comprises:

(a) a control computer with a bi-directional control bus for controlling;
the voltage at the voltage output of the energy source, said voltage output of the energy source having an input control terminal and an output control terminal,
the voltage at the voltage converter means input, said input of the voltage converter means having an input control terminal and an output control terminal,
the voltage at the voltage converter means output, said output of the voltage converter means having an input control terminal and an output control terminal,
the voltage on each said capacitor in the capacitance means, each said capacitor in the capacitance means having an output control terminal,
voltage and current in the clearance gap between the electrodes of at least one selected hollow member, each said pair of electrodes having an output control terminal for measuring voltage and current in said clearance gap during the discharge, the means for connecting the input of the voltage converter means to the energy source output, said means for connecting having an input control terminal and an output control terminal, the charge distributor means having an input control terminal and an output control terminal, the means for controlling flow of water into the cavity through at least one said opening, said flow controlling means having an input control terminal and an output control terminal, and the discharge distributor means having an input control terminal and an output control terminal, said control computer checks;

normal operation of the energy source, normal operation of the voltage converter means, the state of each capacitor in the capacitance means by checking leakage, short circuit and loss of capacitance in each said capacitor, and normal mechanical state of each hollow member and normal functioning of the electrodes, said control computer selects;

each capacitor in the capacitor bank, at least one said cavity where the discharge occurs, wherein each output control terminal being connected to a first direction bus of the bi-directional directional control bus to supply measurement and checking data from the output control terminals to the control computer, each input control terminal being connected to a second direction bus of the bi-directional control bus to provide control signals from the control computer to modify state of devices controlled by the control computer, said devices including the energy source, the voltage converter means, the capacitance means, the means for connecting the input of the voltage converter means to the energy source output, the charge distributor means, the means for controlling flow of water into the cavity, the discharge distributor means, (b) measuring converter means having analog-to-digital converter means converting analog signals into digital signals, and digital-to-analog converter means converting digital signals into analog signals, wherein analog-to-digital converter means having an input and an output, and digital-to-analog converter means having an input and an output, the input of the digital-to-analog converter means being connected to the second direction bus of the bi-directional control bus, and the output of the analog-to-digital converter means being connected to the first direction bus of the bi-directional control bus, (c) means for connecting each said output control terminal to an input of the analog-to-digital converter means to convert analog voltage on each said output control terminal into computer-compatible form at an output of the analog-to-digital converter means, said output of the analog-to-digital converter means being connected to the control bus to input said measured voltages from each output control terminal to the control computer, and (d) means for connecting each said input control terminal to an output of the digital-to-analog converter means to supply computer control instructions from the control computer through the bus to the devices controlled by the control computer, said computer instructions converted by the digital-to-analog converter means into analog signals used to modify state of said devices, the performance of the whole motion drive and to control speed and acceleration of the ship, wherein power of the motion drive, speed and acceleration of the ship are controlled by modifying;

a number of said selected charged capacitors, the capacitance of each selected charged capacitor, a number of said selected cavities where the discharges occur, and a frequency and a number of the discharges.

9. Motion drive of claim 4 wherein the control system comprises:

(a) a control computer with a bi-directional control bus for controlling;

the voltage at the voltage output of each energy source, said voltage output of each energy source having an input control terminal and an output control terminal, the voltage at each voltage converter input having an input control terminal, and an output control terminal, the voltage at each voltage converter output having an input control terminal and an output control terminal, the voltage on each said capacitor in the capacitance means each said capacitor having an output control terminal, voltage and current in the clearance gap between the electrodes of at least one said selected cavity, each said pair of electrodes having output control terminal for measuring voltage and current in said clearance gap during the discharge, the means for connecting the input of the voltage converter means to the energy source output having an input control terminal and an output control terminal, the charge distributor means having an input control terminal and an output control terminal, the means for controlling flow of water into the cavity through at least one said opening, said flow controlling means having an input control terminal and an output control terminal, and the discharge distributor means having an input control terminal and an output control terminal, the means for selecting said energy sources latter said means having an input control terminal and an output control terminal, said control computer checks;

normal operation of the energy sources, normal operation of the voltage converters, the state of each capacitor in the capacitance means by checking leakage, short circuit and loss of capacitance of each said capacitor, and normal mechanical state of each hollow member and normal functioning of the electrodes, said control computer selects;

the energy sources, at least one said voltage converter in the voltage converter means, each capacitor in the capacitor bank, each selected charged capacitor, and at least one said cavity where the discharge occurs, (b) measuring converter means having analog-to-digital converter means converting analog signals into digital signals, and digital-to-analog converter means converting digital signals into analog signals, wherein each said converter means having an input and an output, the input of the digital-to-analog converter means and the output of the analog-to-digital converter means are connected to the bus of the control computer, (c) means for connecting each said output control terminal to an input of the analog-to-digital converter means to convert analog voltage on each said output control terminal into computer-compatible form at an output of the analog-to-digital converter means, said output of the analog-to-digital converter means being connected to the control bus to input said measured voltages from each output control terminal to the control computer, and (d) means for connecting each said input control terminal to an output of the digital-to-analog converter means to supply computer control instructions from the control computer through the bus to devices controlled by the control computer, said devices including the energy source, the voltage converter means, the capacitance means, the means for connecting the input of the voltage converter means to the energy source output, the charge distributor means, the means for controlling flow of water into the cavity, the discharge distributor means, said computer instructions converted by the digital-to-analog converter means into analog signals used to modify state of said devices, the performance of the whole motion drive and to control speed and acceleration of the ship, wherein power of the motion drive, speed and acceleration of the ship are controlled by modifying:
  a number of said selected energy sources,
  a number of said voltage converters,
  a number of said selected charged capacitors,
  the capacitance of each selected charged capacitor,
  a number of said selected cavities where the discharges occur, and
  a frequency and a number of the discharges.

10. The motion drive of claim 1, wherein at least one said cavity is substantially cylindrical in shape.

11. The motion drive of claim 1, wherein the cross-section area of the cavity near the first end is less than the cross-section area of the cavity near the second end.

12. The motion drive of claim 1 having valve means within at least one said opening to accelerate filling of the cavity with water through the opening after the discharge has been made in said cavity and to reduce reverse flow of water into the cavity through the first end, said reverse flow is a result of reduced pressure in the cavity after the discharge.

13. The motion drive of claim 1, wherein at least one said hollow member is placed along beam axis of the ship.

14. The motion drive of claim 1, wherein the first end of at least one said hollow member is pointing toward the stern of the ship.

15. The motion drive of claim 1, wherein the first end of at least one said hollow member is pointing toward the bow of the ship.

16. The motion drive of claim 1, wherein at least one said hollow member placed within a body of the ship with the first end exposed to water outside of the ship through at least one hole in the body, the means for controlling flow of water into the cavity through at least one said opening comprises means for supplying water to each opening, wherein water is openly allowed into and from the cavity through the first end.

* * * * *